United States Patent [19]

Bennett, Jr.

[11] 3,735,367

[45] May 22, 1973

[54] ELECTRONIC RESISTANCE MEMORY

[75] Inventor: Victor A. Bennett, Jr., Gloucester, Mass.

[73] Assignee: Currier-Smith Corporation, Lexington, Mass.

[22] Filed: Apr. 29, 1970

[21] Appl. No.: 32,978

[52] U.S. Cl. .....340/173 SP, 340/166 R, 340/347 NT

[51] Int. Cl. ............................G11c 13/00, G11c 5/02

[58] Field of Search .........................179/90 B, 90 BD, 179/90 K; 340/173 R, 347 NT, 166 R, 173 SP

[56] References Cited

UNITED STATES PATENTS

| | | | |
|---|---|---|---|
| 2,893,636 | 7/1959 | Parks | 340/166 R |
| 3,504,132 | 3/1970 | Wallace | 340/173 SP |
| 3,110,802 | 11/1963 | Ingham et al. | 340/166 R |
| 3,407,271 | 10/1968 | Baynard | 179/90 B |
| 3,515,815 | 6/1970 | Baynard | 179/90 B |
| 3,560,941 | 2/1971 | Wallace | 340/173 R |
| 3,492,659 | 1/1970 | Lee | 340/166 R |
| 3,445,823 | 5/1969 | Petersen | 340/166 R |
| 3,392,376 | 7/1968 | Olsson | 340/166 R |
| 3,383,663 | 5/1968 | David | 340/166 R |
| 3,246,315 | 4/1966 | Gear | 340/166 R |

OTHER PUBLICATIONS

Ammann, S. K., Electronics, Nov. 16, 1964, pgs. 92–94, 96.

Schmid, H., Electronics, Nov. 28, 1966, pgs. 88–94.

*Primary Examiner*—Malcolm A. Morrison
*Assistant Examiner*—James F. Gottman
*Attorney*—Charles Hieken

[57] ABSTRACT

A resistance value represents a digit. A voltage difference applied across each resistance in predetermined sequence produces a current inversely proportional to the resistance value. This current charges a capacitor until the voltage across the capacitor reaches a predetermined biasing potential that causes a following transistor to conduct at a time inversely proportional to current, and, hence, directly proportional to the resistance. The time interval thus defined may gate through a number of pulses from a pulse source that may function as telephone dialing pulses, the number being proportional to the selected resistor.

10 Claims, 2 Drawing Figures

INVENTOR
VICTOR A. BENNETT, JR.
BY Wolf, Greenfield, Hieken & Sacks
ATTORNEYS

ELECTRONIC RESISTANCE MEMORY

BACKGROUND OF THE INVENTION

The present invention relates in general to memories and more particularly concerns a novel resistance reading memory characterized by relatively low cost, high reliability, ease of storage, relatively low storage costs per relevant item of information and ability to store in analog form a quantity that is readily digitized.

It is an important object of this invention to provide a reading memory.

It is another object of the invention to achieve the preceding object with a memory element capable of storing a relatively large amount of information.

It is a further object of the invention to achieve one or more of the preceding objects while readily converting stored data into digital form.

It is another object of the invention to achieve one or more of the preceding objects with apparatus that is reliable and relatively free from complexity.

SUMMARY OF THE INVENTION

According to the invention, there are a plurality of impedance means such as resistive means each having one end connected to a respective one of a corresponding plurality of selecting terminals and the other end connected to a common terminal. The magnitude of the impedance of each impedance means such as the resistance of each resistive means represents a predetermined stored value and identifying the order number of the selecting terminals identifies the address of the stored quantity. Means are provided for establishing a predetermined potential difference between a selected terminal and the common terminal to provide a current representative of the impedance of the selected impedance means such as the resistance of the selected resistive means. Means are provided for measuring this current. Preferably the means for measuring the current comprises means for converting the current into a time interval.

In a specific form the means for measuring the current comprise capacitive means that charges to a predetermined potential in a time interval proportional to the resistance of the selected resistive means. By gating clock pulses from a source thereof to an output terminal, the number of pulses during this time interval is proportional to the digit represented by the resistance of the resistive means.

Numerous other features, objects and advantages of the invention will become apparent from the following specification when read in connection with the accompanying drawing.

DETAILED DESCRIPTION OF PREFERRED EMBODIMENTS

Figure 1:
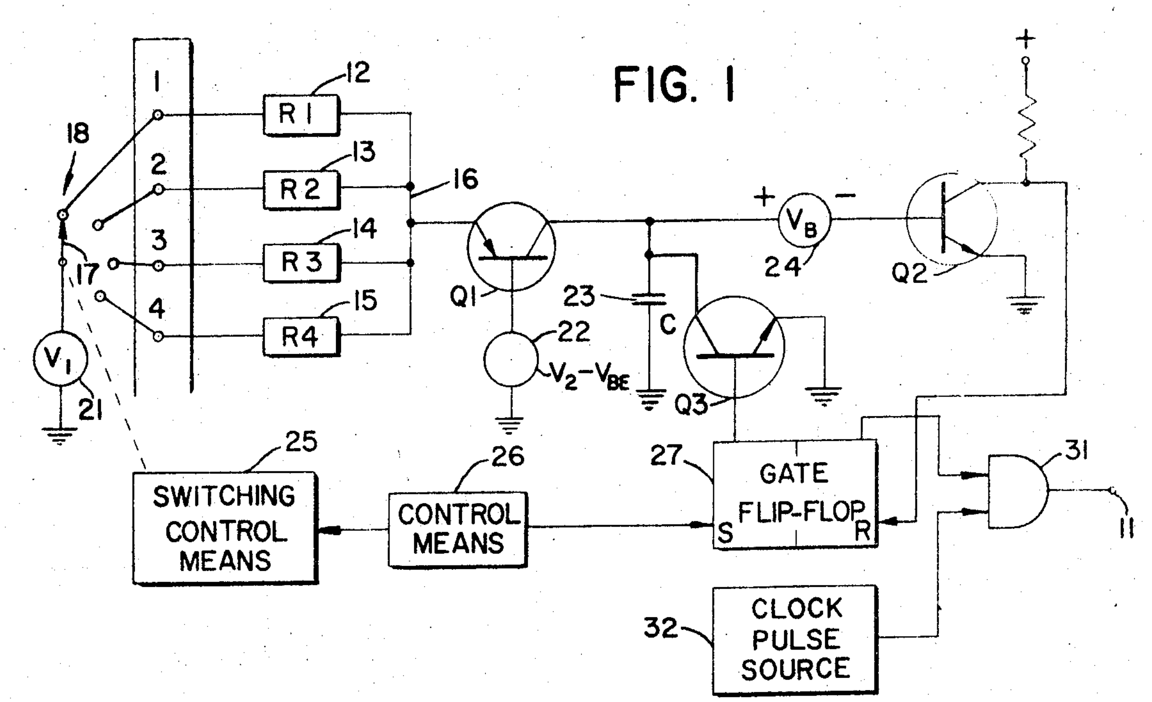
FIG. 1 is a combined block-schematic circuit diagram of an exemplary embodiment of the invention.

With reference now to the drawing and more particularly FIG. 1 thereof, there is shown in simplified form a combined block-schematic circuit diagram of an embodiment of the invention. Output terminal 11 receives a train of output pulses representative of the resistance value of the then selected one of resistors 12–15. In the exemplary embodiment shown there are four resistors 12, 13, 14 and 15 of resistances R1–R4, respectively, having one end joined to a common line 16 connected to the emitter of PNP transistor Q1. The other ends of resistors 12–15 are connected to selection terminals 1–4, respectively. The arm 17 of switch 18 couples a potential of V1 from source 21 to respective ones of terminals 1–4 to thereby select an appropriate one of resistances 12–15.

The base of transistor Q1 receives a potential $(V_2-V_{BE})$ from source 22 to establish essentially the potential V2 on common line 16 where its emitter is connected. A capacitor 23 of value C is connected to the collector of transistor Q1 and coupled to the base of NPN transistor Q2 by a biasing source 24 of voltage $V_B$.

Switching control means 25 responds to a signal from control means 26 to connect the arm 17 of switch 18 to a selected one of terminals 1–4. Control means 26 provides a signal to the set input of gate flip-flop 27 at the same time it commands switching control means 25 to shift arm 17 to a new terminal. Gate 31 receives an enabling signal from gate flip-flop 27 when the latter is set and then passes clock pulses from clock pulse source 32 to output terminal 11. A signal from transistor Q2 is applied to the reset input of gate flip-flop 27 to then disable gate 31 when capacitor 23 has charged to the biasing potential $V_B$ in a manner now to be described.

Having considered the physical relationship among the different elements, the principles of operation will be described. It is convenient initially to assume that capacitor 23 is discharged to establish essentially ground potential on the collector of transistor Q1 and that arm 17 has just been connected to terminal 1, thereby placing a potential essentially of V1-V2 across resistor 12 of value R1. Transistor Q1 then draws a current of value essentially (V1-V2)/R1 that charges capacitor 23. If the value C is sufficiently large so that the effective time constant of the charging circuit including the collector resistance of transistor Q1 in series with resistor 12 of resistance value R1 is long enough, capacitor 23 charges essentially linearly until it reaches essentially the biasing potential $V_B$. At this instant transistor Q2 conducts to provide a signal that resets gate flip-flop 27.

As explained above, gate flip-flop 27 was set at the time arm 17 was just connected to terminal 1. Thus, the interval in which gate flip-flop 27 enables gate 31 to pass clock pulses from source 32 to output terminal 11 corresponds to the time it takes capacitor 23 to charge to the potential $V_B$. This time interval is inversely proportional to the charging current provided by transistor Q1 which in turn is inversely proportional to the resistance value R1. Thus, this time interval is proportional to the resistance value R1. And the number of pulses provided on output terminal 11 during this interval is proportional to the resistance value R1.

When transistor Q2 conducts to reset gate flip-flop 27, gate flip-flop 27 pulls capacitor 23 to zero through transistor Q3.

The train of pulses on output terminal 11 may then be utilized in many ways. For example, they may be used as dial pulses to dial a telephone digit represented by the resistance value R1. Then control means 26 may actuate switching control means 25 to move arm 17 to the next selected memory cell, typically terminal 2. The sequence of events just described would then occur again.

Figure 2:
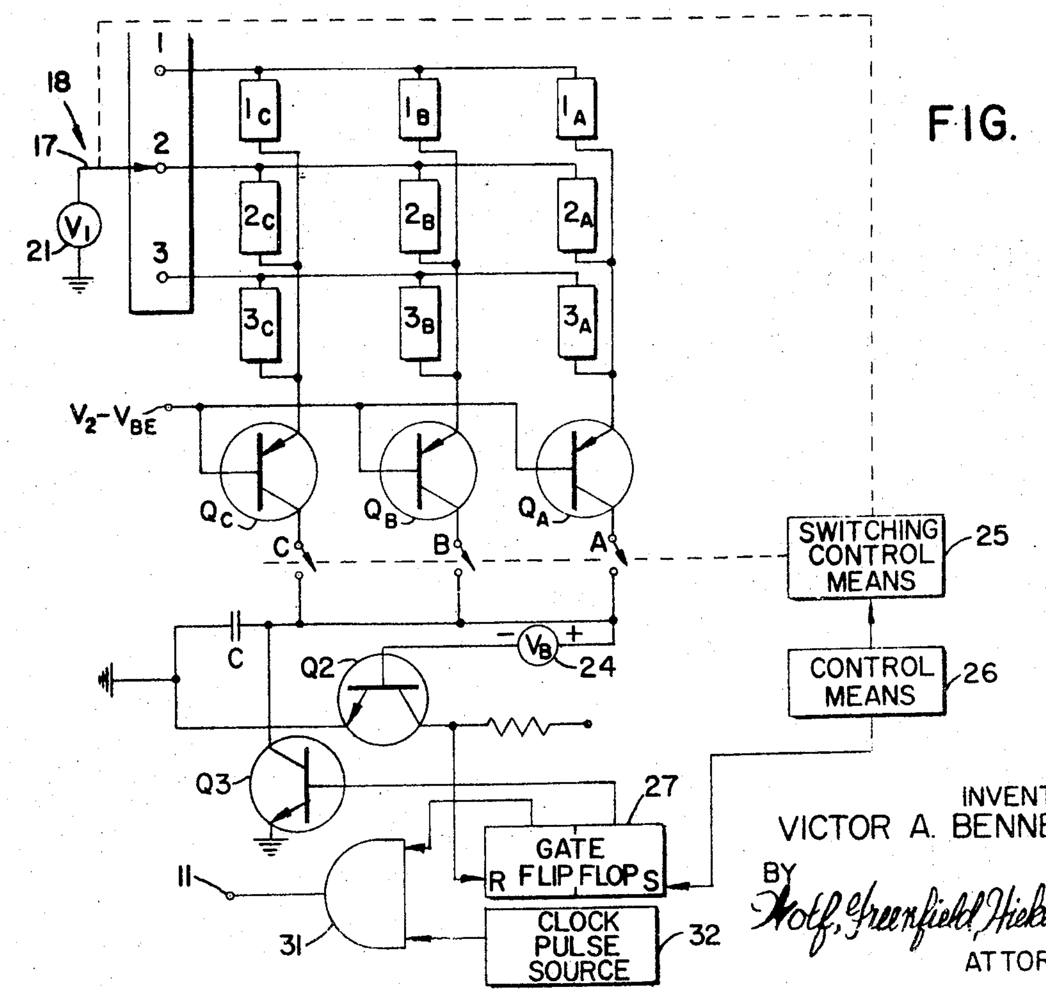
FIG. 2 is a combined block-schematic circuit diagram of another form of the invention having a matrix of storage elements.

Referring to FIG. 2, there is shown another embodiment of the invention illustrating how a resistive storage element in a multidimensional matrix may be addressed by its particular row and column. In this example there is a 3×3 matrix of nine resistors designated by a numeral corresponding to the resistor row and a letter corresponding to the resistor column. One of the ends of the resistors in rows 1, 2 and 3 are connected to respective terminals 1, 2 and 3 for selection by arm 17 of switch 18 to receive the potential V1. The other end of each resistance in a column is connected to the emitter of a respective one of PNP transistors QA, QB and QC. The collectors of transistors QA, QB and QC are connected to capacitor 23 by switches A, B and C, respectively. Preferably electronic logical switching is used. Capacitor 23 is coupled to the base of transistor Q2 as in FIG. 1 by the biasing source 24 of potential $V_B$.

To select a particular resistance, arm 17 of switch 18 is connected to the terminal connected to the row of that resistance, and one of switches A, B and C, corresponding to the column of the resistance is closed, thereby establishing a potential difference V1-V2 across that resistance. Thus, if switch A were closed, the potential V2-V1 would appear across resistance 2A.

The remaining elements function in substantially the same manner as described above in connection with the system of FIG. 1. However, switching control means 25 not only selects the arm position of switching arm 17, but also determines which of switches A, B and C is closed. The invention thus comprises a means for individually addressing a single storage element in a matrix of elements.

The invention is especially useful for storing digital information, such as the digits of a telephone number. Thus, the matrix could contain digits of a telephone number and be scanned in sequence to provide on terminal 11 a series of dialing pulses that could be used to dial a particular telephone station. The invention could be used for storing any kind of data.

It has been found possible to easily store 10 different digital values in a matrix. Many more may be stored. A typical value for digit 1 is 24k ohms and for digit 9 is 425k ohms, although other values could be used. A suitable transistor for transistor Q1 and transistors QA, QB and QC was a type 2N4061 transistor and for transistor Q2 a type T1598 transistor. A suitable value C for capacitor 23 for 2 microfarads.

There has been described a novel reading resistance memory characterized by high reliability, the ability to store considerable information in a cell in a manner facilitating easy access and conveniently convertible to a digital signal. It is evident that those skilled in the art may now make numerous uses and modifications of and departures from the specific embodiments described herein without departing from the inventive concept. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for storing information comprising, a plurality of resistive means, means for selectively establishing a predetermined d-c potential difference of constant magnitude across any selected one of said resistive means to provide a current of magnitude that is the ratio of the magnitude of said predetermined potential difference to the magnitude of the impedance of the selected resistive means, means for detecting the magnitude of said current comprising, capacitive means, means for delivering said current to said capacitive means to provide a potential across said capacitive means that is a linear function of time, a source of reference potential, means responsive to the potential on said capacitive means bearing a predetermined relationship to said reference potential for providing an output signal, sources of first and second d-c potentials, a first transistor having its emitter coupled to a common terminal, its collector coupled to said capacitive means and its base coupled to said second potential source, a plurality of selection terminals each coupled to respective ones of said resistive means, means for jointly coupling a plurality of said resistive means to said common terminal, and means for selectively coupling said first potential source to respective ones of said selection terminals to establish said predetermined potential difference across selected ones of said resistive means corresponding substantially to the difference between said first and second potentials.

2. Apparatus in accordance with claim 1 and further comprising, switching control means for establishing said potential difference across a selected one of said impedance means, a source of clock pulses, an output terminal, means responsive to the commencement of establishment of said potential difference across a selected impedance means for initiating the transfer of clock pulses from said clock pulse source to said output terminal, and means responsive to the occurrence of said output signal for ending the transfer of said clock pulses to said output terminal, whereby the number of pulses during the time interval between said commencement and said ending transmitted to said output terminal is directly proportional to said current magnitude and representative of the magnitude of the impedance of the then selected impedance means.

3. Apparatus in accordance with claim 1 and further comprising, means responsive to said output signal for restoring the potential on said capacitive means to a predetermined initial value.

4. Apparatus in accordance with claim 1 wherein said resistive means are arranged in a multidimensional matrix and further comprising, means for connecting first ends of each of said resistive means to an associated one of a group of selectable terminals whereby respective first subgroups of said resistive means are associated with respective ones of said selectable terminals, and means for coupling second ends of each of said resistive means selectively to a common output whereby respective second subgroups different from said first subgroups of said resistive means are associated with respective one of the latter means for coupling, each of said first subgroups having only one of said resistive means that is also a member of a second subgroup, and means for selecting a first subgroup and a second subgroup to establish said predetermined potential difference across the resistive means common to the first and second subgroups then selected.

5. Apparatus in accordance with claim 4 wherein said capacitive means is connected to said common output, and the selected means for coupling the second ends comprises means for delivering said current to said capacitive means.

6. Apparatus in accordance with claim 5 wherein each of said means for coupling comprises, a transistor having its emitter coupled to a second group of said second ends, its base coupled to said source of a second potential and switching means for coupling the transistor collector to said common output, and means for selectively coupling said first potential source to respective ones of said selectable terminals and for selectively closing respective ones of said switching means to establish said predetermined potential difference across selected ones of said resistive means corresponding substantially to the difference between said first and second potentials.

7. Apparatus in accordance with claim 6 and further comprising, switching control means for establishing said potential difference across a selected one of said resistive means, a source of clock pulses, an output terminal, means responsive to the commencement of establishment of said potential difference across a selected resistive means for initiating the transfer of clock pulses from said clock pulse source to said output terminal, and means responsive to the occurrence of said output signal for ending the transfer of said clock pulses to said output terminal, whereby the number of pulses during the time interval between said commencement and said ending transmitted to said output terminal is directly proportional to said current magnitude and representative of the resistance of the then selected resistive means.

8. Apparatus in accordance with claim 7 and further comprising, means responsive to said output signal for restoring the potential on said capacitive means to a predetermined initial value.

9. Apparatus for storing information in accordance with claim 1 wherein said plurality of resistive means are arranged in a multidimensional matrix with each resistive means identifiable by a uniquely identified matrix element, and said means for selectively establishing includes means for addressing a selected one of said resistive means identifiable by the associated matrix element.

10. Apparatus for storing information in accordance with claim 9 wherein said matrix element is identified by at least its row and column.

* * * * *